United States Patent [19]

Winstel et al.

[11] Patent Number: 5,785,475
[45] Date of Patent: Jul. 28, 1998

[54] CARGO RESTRAINER

[75] Inventors: Terry C. Winstel, Cincinnati, Ohio; Gerald D. Martin, 8780 Ashbrook Dr., West Chester, Ohio 45069

[73] Assignee: Gerald D. Martin, Westchester, Ohio

[21] Appl. No.: 21,161

[22] Filed: Feb. 19, 1993

Related U.S. Application Data

[63] Continuation-in-part of Ser. No. 977,767, Nov. 19, 1992, abandoned.

[51] Int. Cl.$^6$ .................................... B60P 7/15; B61D 45/00
[52] U.S. Cl. .......................... 410/146; 410/149; 410/145
[58] Field of Search ............................. 410/143–151

[56] References Cited

U.S. PATENT DOCUMENTS

| | | | |
|---|---|---|---|
| 2,673,529 | 3/1954 | Stough | 410/144 |
| 2,806,436 | 9/1957 | Johnston | 410/147 |
| 2,879,722 | 3/1959 | Dunlap . | |
| 2,973,934 | 3/1961 | Foster | 410/143 |
| 2,977,899 | 4/1961 | Doherty et al. . | |
| 2,980,037 | 4/1961 | Elsner | 410/144 |
| 3,071,086 | 1/1963 | Dunlap . | |
| 3,082,707 | 3/1963 | Prendergast | 410/149 |
| 3,171,627 | 3/1965 | Tapler et al. | 410/146 |
| 3,774,939 | 11/1973 | Freads et al. | 410/149 |
| 4,079,677 | 3/1978 | Vandergriff et al. . | |
| 4,256,425 | 3/1981 | Burgess et al. | 410/149 |
| 4,332,515 | 6/1982 | Twyman . | |
| 4,464,089 | 8/1984 | Allen . | |
| 4,494,896 | 1/1985 | DiFranco . | |
| 5,104,269 | 4/1992 | Hardison | 410/145 |
| 5,192,187 | 3/1993 | Sweet | 410/151 |

FOREIGN PATENT DOCUMENTS

| | | | |
|---|---|---|---|
| 897499 | 4/1969 | Canada | 410/147 |
| 56539 | 6/1967 | German Dem. Rep. | 410/144 |

OTHER PUBLICATIONS

"Interior Van Restraint Systems", Ancra International, Apr. 1990.

Primary Examiner—Karen B. Merritt
Assistant Examiner—Gregory A. Morse
Attorney, Agent, or Firm—Thompson Hine & Flory LLP

[57] ABSTRACT

A cargo retainer for separating cargo and preventing shifting of cargo within a vehicle during transportation is disclosed. The cargo retainer includes an elongate outer tubular member and two tubes telescopically received within the outer tubular member. The outer tubular member and telescoping tubes are preferably formed of polymeric material. Short metal reinforcement tubes are inserted in the outer ends of the telescoping tubes to strengthen the connection point between the cargo retainer and the support structure in the vehicle's cargo compartment. Latch members are attached at the outer ends of the telescoping tubes for attaching the cargo retainer across the width of a vehicle's cargo compartment. The latch members preferably pivot about an axis normal to the axis of the cargo retainer. A retraction mechanism is provided in the form of a tension spring connecting the inner ends of the telescoping tubes together. The telescoping tubes and latch members fully retract into the outer tubular member.

20 Claims, 2 Drawing Sheets

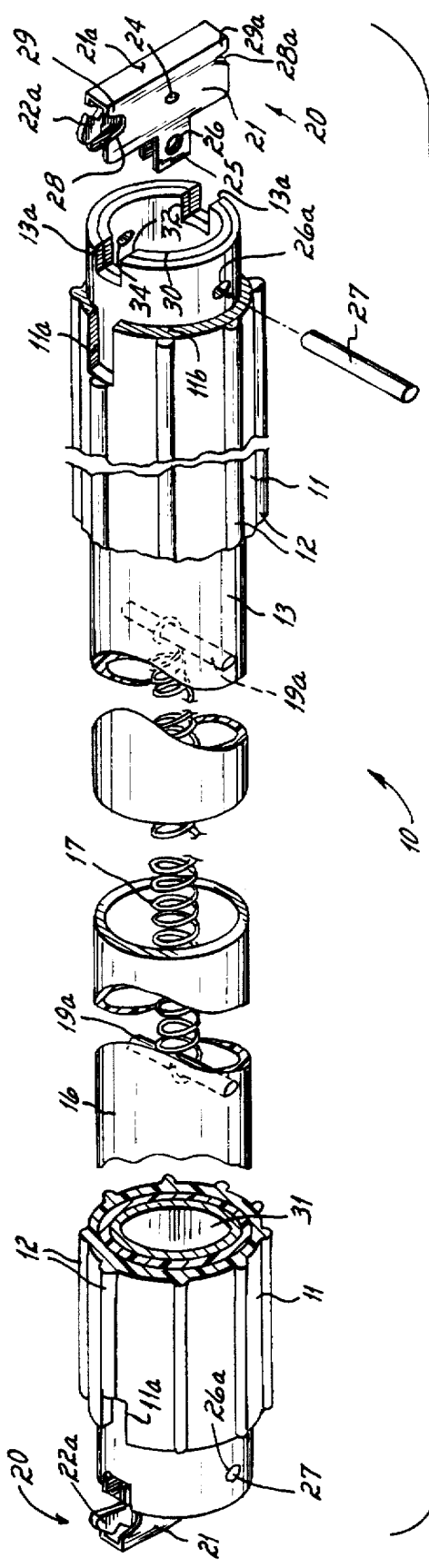
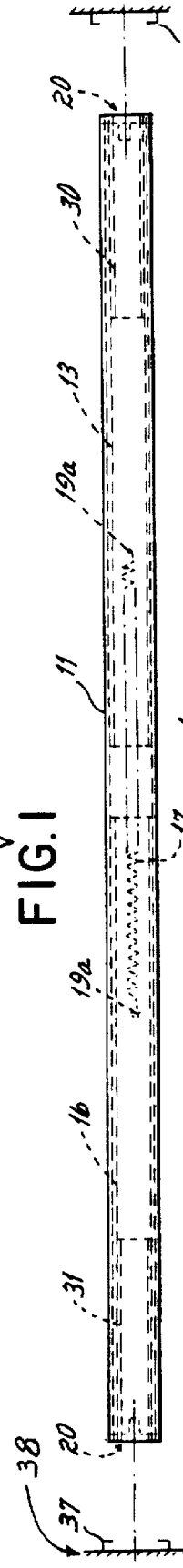
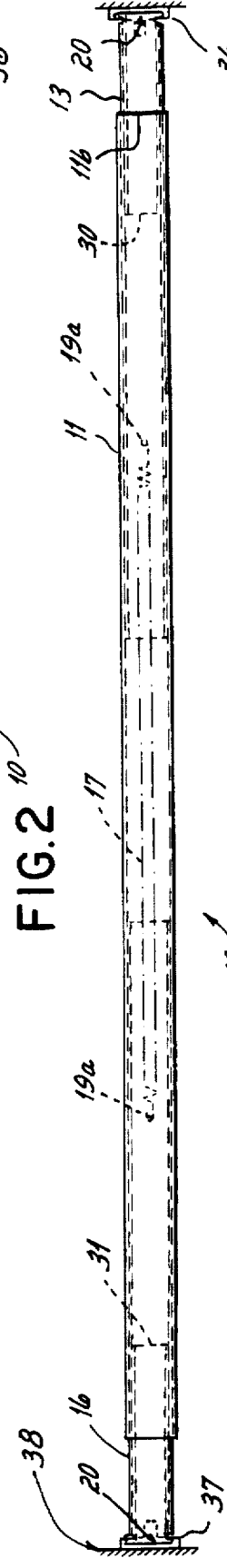

CARGO RESTRAINER

CROSS REFERENCE TO RELATED APPLICATIONS

This application is a continuation-in-part of U.S. application Ser. No. 07/977,767, filed Nov. 19, 1992, now abandoned.

BACKGROUND OF THE INVENTION

This invention generally relates to cargo restrainers and more specifically to tubular, telescopic restrainers that are installed across the width of a vehicle's freight container or cargo compartment to secure and separate the cargo within the compartment.

In the past, various methods of securing freight in freight containers have been used, however, many of these methods have been time and labor intensive. Such methods have included the use of various arrangements utilizing straps, ropes, buckles and/or hooks. Strap arrangements and the like, which are attached to opposite sides of the freight container and tightened by drawing their ends inwardly, cause the freight container walls to bow inwardly in an undesirable fashion.

More recently, it has become common to use metal "batten" restrainers across the freight container of, for example, a railway or over-the-road trailer to brace and separate large objects in the freight container. The use of such battens has been generally recognized as one of the most efficient ways to speed up freight loading and unloading operations. These battens are used within typical freight containers that have interior walls having a plurality of latch receiving slots horizontally aligned across the width of the freight container. The length of the batten is commonly adjustable for easier installation and removal, and to accommodate freight containers of different widths. The battens may be installed across the width of the freight container at different heights according to the size and shape of the cargo.

A typical adjustable batten having a latch mechanism at each end is shown in U.S. Pat. No. 4,079,677 to Vandergriff et al. Vandergriff et al. disclose an outer tubular member that slidably receives a latch mechanism at each end. The latch mechanism has a lower fixed clasp portion having a notch that receives a lower portion of a standard "E-track" rail and an upper, pivotal clasp portion which locks the latch in place.

Similar but more complicated arrangements are shown in U.S. Pat. Nos. 2,879,722 and 3,071,086 to Dunlap (hereinafter Dunlap '722 and Dunlap '086). Dunlap '072 discloses a cross bar having a main tubular member and a "header" or latch member slidably retained at each end. Each header includes pivoting, spring-loaded pins adapted to fit into holes contained in a support member. Dunlap '086 discloses a freight bracing apparatus having one rigidly secured latch means and one telescoping latch means attached to the ends of an elongate main member. The latch mechanisms include pivoting clasp members adapted to engage support members on the inside walls of a freight compartment. Other generally related cargo restrainers are disclosed in U.S. Pat. No. 2,977,899 to Doherty et al., U.S. Pat. No. 4,332,515 to Twyman, U.S. Pat. No. 4,464,089 to Allen, and U.S. Pat. No. 4,494,896 to DiFranco.

Heretofore, batten cargo restrainers have been relatively bulky structures formed of metal, wood or a combination of both. Past batten cargo restrainers also suffer from the disadvantage that they cause the walls of the freight container to bow outwardly in an undesirable fashion and have increasingly been stolen for their metal content. Further, the latch members, although easier to install than many strapping systems, are nevertheless difficult to install in one quick motion. Furthermore, past devices have presented safety concerns since they leave the latch mechanisms exposed when the device is not in use.

Accordingly, it has been one object of the invention to provide a lightweight yet strong bracing structure capable of retraining heavy objects yet easily handleable by one operator.

It has been another object of the invention to ease the installation of a cargo restrainer by providing easily manipulable latch mechanisms at the ends of the cargo restrainer.

SUMMARY OF THE INVENTION

To these ends, a preferred embodiment of the present invention includes an outer tubular member and two inner tubes telescopically received at the two ends of the outer tubular member. The two telescoping tubes are preferably connected together with a tension spring and have latch members at their outer ends for attachment to support members in the cargo compartment of a vehicle. The latch members pivot about an axis normal to the axes of the outer tube and the telescoping tubes. Retraction means are provided to fully retract the telescoping tubes and the latch members inward of the outer ends of the outer tubular member.

The outer tube and telescoping tubes are preferably constructed of a lightweight yet strong, plastic material which slidably receives first and second telescoping tubes at each end. The telescoping tubes preferably have a combined length that is less than the total length of the outer tube such that they may be completely received within the outer tube. The telescoping tubes have an expanded position in which they are connected across the inside of a cargo carrying vehicle to standard "E-track" rails running along the inside walls of the cargo compartment of the vehicle. The telescoping tubes also have a contracted position in which the telescoping tubes are fully received within the outer tube. The telescoping tubes are preferably biased into the contracted position by a tension spring which connects their inner ends together.

The outer ends of the telescoping tubes each have a spring-loaded latch, each latch member preferably being pivotally connected to the outer end of a respective telescoping tube. Each latch member includes a conventional spring-loaded clasp or catch mechanism that is designed to easily connect with a standard "E-track" rail inside the cargo compartment of a vehicle. The latch member includes a housing and a spring-loaded catch pivotally connected inside the housing.

A preferred embodiment of the present invention contemplates the attachment of an inwardly projecting pivot arm having an aperture which receives a pin member connected to the outer end of a respective telescoping tube. The latch member may thus be pivoted about the axis of the pin member which is normal to the axis of the telescoping tube to which it is attached. Slots are provided in the outer ends of the telescoping tubes to allow room for the pivoting action of each latch member to take place. The pivoting action of the latch member allows the operator to easily connect the latch with common "E-track" rails.

In one aspect of the present invention, slots are provided in the outer tube to allow full retraction of the telescoping tubes within the outer tube. The slots in the outer tube are aligned with the slots in the telescoping tubes to allow each latch mechanism to be fully retracted inward of the outer ends of the outer tube. This feature eliminates the sharp edges which would be associated with protruding latch components and thereby improves the safety of the device.

In another aspect of the present invention, reinforcement tubes are provided in the outer ends of each telescoping tube. These reinforcement tubes are each rigidly secured inside the outer ends of the telescoping tubes preferably by way of a frictional fit. The reinforcement tubes are constructed of a material which is much stronger than the materials used for the outer tube and the telescoping tubes. As previously mentioned, the outer tube and the telescoping tubes are preferably constructed of a lightweight, yet strong, polymeric material such as polyvinyl chloride or polyethylene. The reinforcement tubes may be constructed of a metal such as steel, aluminum or titanium. When using reinforcement tubes, the pin member which is part of the pivoting mechanism for each latch assembly is preferably connected to both the telescoping tube and the reinforcement tube at each end of the cargo retainer.

These and other features and objectives of the invention will become more readily apparent from the following detailed description taken in conjunction with the accompanying drawings.

BRIEF DESCRIPTION OF THE DRAWINGS

FIG. 1 is an exploded perspective view of the cargo retainer of the present invention;

FIG. 2 is a side elevational view of the cargo retainer in a contracted position;

FIG. 3 is a side elevational view of the cargo retainer in an expanded position with the latch mechanisms connected to support structures.

DESCRIPTION OF PREFERRED EMBODIMENTS

Figure 4:
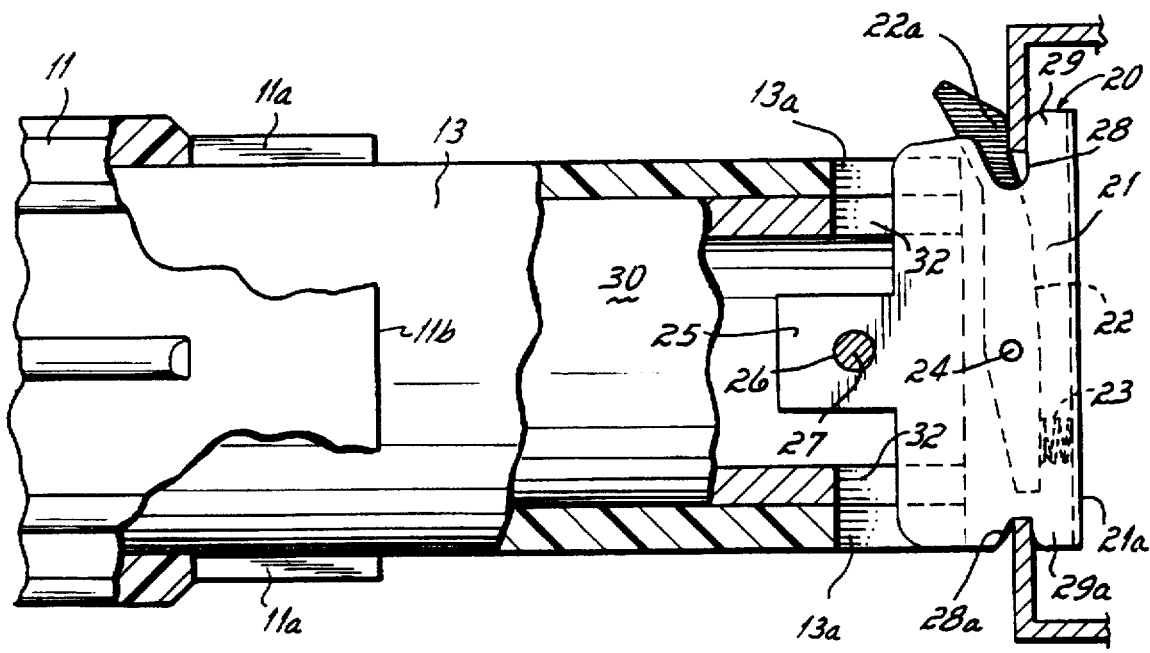
FIG. 4 is a side elevational view of one end of the cargo retainer partially cut away to show the inner details of each component.
Figure 5:
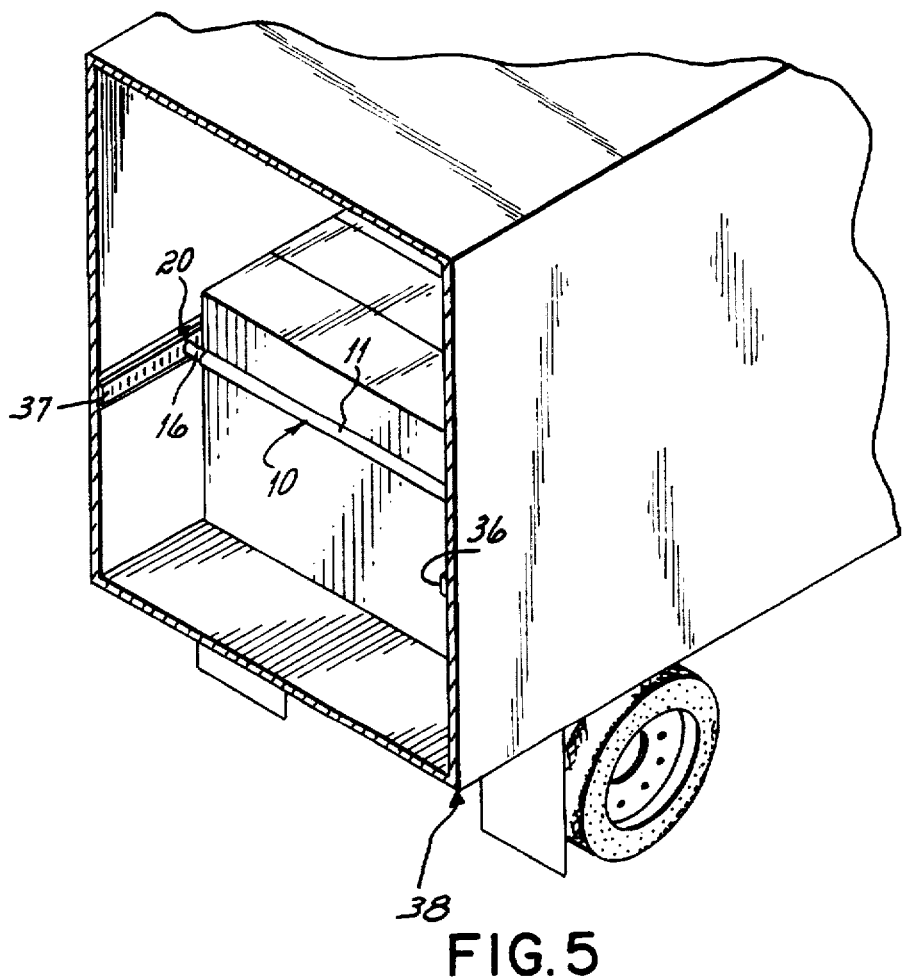
FIG. 5 is a perspective view of the cargo retainer of the present invention in place in the cargo compartment of a vehicle.

Turning first to FIG. 1, a cargo retainer 10 is shown and includes an outer tube 11 and two telescoping tubes 13, 16 sized to easily slide within the outer tube 11. The length of the outer tube 11 is designed to be smaller than the width the cargo compartment of a vehicle in which the cargo retainer 10 is to be used. The cargo retainer may be manufactured in a range of sizes to meet the requirements of differently sized vehicles. The two telescoping tubes 13, 16 have a combined length which is shorter than the length of the outer tube 11. Thus, the telescoping tubes 13, 16 may both be retracted fully into the outer tube 11. Of course, the two telescoping tubes 13, 16 could be modified to telescope with each other so that their combined length would not be shorter than the length of the outer tube 11.

A retraction mechanism is provided for the telescoping tubes 13, 16 in the form of a tension spring 17 which is connected at each end to pins 19a. The pins 19a are connected across the inside diameters of each telescoping tube 13, 16. Thus, as shown in FIG. 2, the two telescoping tubes 13, 16 are normally in a retracted position due to the force of the tension spring 17 pulling the two telescoping tubes toward one another.

As shown in FIG. 3, the telescoping tubes 13, 16 may be pulled out from the outer tube 11 against the force of the spring 17 to a length sufficient to extend across the width of the cargo compartment of a vehicle 38. As with the length of the outer tube, the length of the two telescoping tubes 13, 16 may be chosen according to the range of sizes of the vehicles in which the cargo retainer 10 will be used.

Referring again to FIG. 1 taken in conjunction with FIG. 4, identical latch members 20 are attached at the outer end of each telescoping tube 13, 16. The latch member 20 and its attachment to the telescoping tube 13 will be described in detail with the understanding that the latch member 20 attached to the second telescoping tube 16 is identical. The latch member 20 includes a housing 21 containing a clasp member 22 which is connected to the housing at a pivot 24 which allows the clasp member 22 to pivot against the force of a compression spring 23 also contained within the housing 21. This type of spring-loaded clasp arrangement is commonly used in conjunction with standard "E-track" rail systems found in many vehicle cargo compartments.

As shown in FIG. 4, the housing 21 has a pair of recesses 28, 28a which are adapted to receive portions of the rail 36. To firmly seat the latch member 20 in a slot in the rail 36, the upper end 22a of the clasp 22 is biased by the force of the spring 23 against the outside surface of the rail 36. The latch member also firmly seats lip members 29, 29a against the inside surface of the rail 36.

The latch member 20 of the present invention preferably has a projection or pivot arm 25 extending from the rearward end of the housing 21. The pivot arm 25 includes an aperture 26 which receives a pivot pin 27 to allow the latch member 20 to pivot about an axis normal to the axis of the cargo retainer 10. The pivot pin 27 is rigidly connected to the telescoping tube 13 through apertures 26a in the telescoping tube 13. The outer end of the telescoping tube 13 has a pair of slots 13a designed to allow pivoting action of the latch member 20 to take place. Reinforcement tube 30 also has a pair of slots 32 aligned with the slots 13a in the telescoping tube 13 to allow for the pivoting action of the latch member 20.

As also shown in FIG. 4, the outer tubular member 11 has a pair of slots 11a aligned with the slots 13a and 32 of the telescoping tube 13 and reinforcement tube 30, respectively. The slots 11a of the outer tube 11 are longer than the slots in the telescoping tube and reinforcement tube such that when the telescoping tube 13 is fully retracted, the latch member 20 will be automatically fully retracted under the force of the spring 17 into the slots 11a. The slots 11a in the outer tube 11 receive upper and lower portions of the latch member 20 such that the outer edge 21a of the latch member housing 21 is either flush, or slightly inside, the outside edge 11b of the outer tube 11.

As previously mentioned, both the outer tube 11 and the two telescoping tubes 13, 16 may be advantageously formed of a lightweight, polymeric material such as polyvinyl chloride or polyethylene so as to reduce both the cost and the weight associated with the cargo retainer 10. The outer tube preferably has ribs 12 running along the length of its outside surface to prevent the tube from rolling. Also, reinforcement tubes 30, 31 are provided when the outer tube 11 and telescoping tubes 13, 16 are formed of polymeric material. The reinforcement tubes 30, 31 are rigidly secured within the outer ends of the telescoping tubes 13, 16. The reinforcement tubes 30, 31 are preferably secured within the telescoping tubes 13, 16 by choosing a outer diameter for each reinforcement tube 30, 31 and an inner diameter for each telescoping tube 13, 16 so as to create a rigid frictional fit between each telescopic tube 13, 16 and its associated reinforcement tube 30, 31.

The reinforcement tubes 30, 31 are formed of a metal such as steel, aluminum or titanium and are of a length considerably shorter than the telescoping tubes 13, 16 and the outer tube 11. For example, when the outer tube 11 is made in a standard length of 81", the telescoping tubes will each preferably be 38⅜" long and each reinforcement tube will be 12" long. The reinforcement provided by these metal reinforcement tubes 30, 31 allows the outer tube 11 and telescoping tubes 13, 16 to be formed from less expensive, lightweight polymeric materials.

As shown in FIG. 1, when reinforcement tubes are used, the pivot pin 27 attached to the pivot arm 25 of the latch 20 extends through and is rigidly secured via, for example, a frictional fit to apertures 26a, 34 in the telescoping tube 13 and reinforcement tube 30, respectively. This further reinforces the connection between the latch members 20 and the cargo retainer 10 thus reducing the chances that a shifting cargo load will break the cargo retainer at this area of high stress.

When using the cargo retainer 10 of the present invention, the operator will first pull out and grasp an outer end of one of the telescoping tubes 13, 16. The operator will then apply downward pressure on the top of the clasp member 22, thereby pivoting the upper portion 22a of the clasp member 22 rearwardly and pivoting the entire latch member 20 about the pin 27 such that the top of the latch member is angled away from the end of the telescopic tube. The latch member 20 is then inserted into a slot in the rail 36 such that an upper portion of the rail 36 is contained in the upper recess 28 of the latch member housing 21. The upper end of the latch member 20 is then pivoted about the pin 27 back to its original position such that the bottom recess 28a of the latch member housing 21 receives a lower portion of the rail 36. The clasp 22 is then released so that the upper portion 22a of the clasp 22 engages the outside surface of the rail 36. When the operation is complete, the latch member 20 is in firm engagement with the rail 36 and is positioned as shown in FIG. 4. The operator then goes through an identical process to attach the latch member 20 at the opposite end of the cargo retainer 10 to the rail 37 on the opposite side of the cargo compartment of the vehicle as shown in FIG. 3.

Although the cargo retainer 10 of the present invention has been shown and described in a form used with common "E-track" rails running lengthwise along the sides of the cargo compartment of a vehicle, it will be appreciated that the cargo retainer may be just as easily used with rails running vertically by merely rotating the cargo retainer 90° before inserting the latch members in the rails. Also, other clasp mechanisms may be substituted for the specific spring-loaded clasp mechanism shown and described herein.

Accordingly, the present invention provides a cargo retainer which is faster and easier to install across the cargo compartment of a vehicle as a result of the pivoting nature of the latch members and is safer to use due to the full retractability of the latch members. Furthermore, the cargo retainer is more easily handled and may be made less expensively than prior devices due to the use of lightweight polymeric materials for the major structural components while utilizing strategically placed reinforcements in areas of high stress concentration.

These and other objectives and advantages of the invention will become readily apparent to one of ordinary skill in the art without departing from the scope of the invention, and applicant intends to be bound only by the claims appended hereto.

We claim:

1. In a cargo-shoring assembly adapted to releasably engage opposing mounting members secured to a freight transport vehicle, said cargo-shoring assembly being provided with (a) an elongated hollow-form cargo-engaging member having opposing first and second ends; (b) first and second extenders slidably carried in the cargo-engaging member and respectively located at the first and second cargo-engaging member ends, each of said extenders having an outer end; and (c) first and second latch clips pivotally mounted, respectively, on the first and second extenders a fixed distance inwardly of the outer ends thereof, each of said latch clips having a body extending transversely to the cargo-engaging member and adapted to releasably engage one of the mounting members secured to the freight transport vehicle, that improvement which comprises:

i) at least one latch clip-receiving slot projecting inwardly from each of the first and second ends of the cargo-engaging member a distance sufficient to permit the body of the respective latch clip to be removably and substantially fully received within the cargo-engaging member with no portion of said latch clip body extending axially beyond the respective end of said cargo-engaging member; and ii) at least one latch clip-receiving notch projecting inwardly from the outer end of each of the extenders a distance sufficient to permit a portion of the body of the respective latch clip to be housed within the respective extender and to permit pivotal movement of said latch clip relative to said extender.

2. A cargo retainer comprising:

an outer tube having first and second ends;

first and second telescoping tubes slidably received in said first and second ends, respectively, of said outer tube, said first telescoping tube having an outer end portion proximate said first end of said outer tube and said second telescoping tube having an outer end portion proximate said second end of said outer tube;

a first reinforcing tube secured in the outer end of said first telescoping tube and coaxial with said first telescoping tube:

a second reinforcing tube secured in the outer end of said second telescoping tube and coaxial with said second reinforcing tube.

a first latch pivotally attached to said outer end portion of said first telescoping tube and to said first reinforcing tube for attaching said first telescoping tube to a support structure; and, a second latch pivotally attached to said outer end portion of said second telescoping tube and to said second reinforcing tube for attaching said second telescoping tube to a support structure.

3. The cargo retainer of claim 2 further comprising:

spring biasing means for biasing said first and second telescoping tubes toward one another.

4. The cargo retainer of claim 3 wherein said spring biasing means is a tension spring connected between inner ends of said first and second telescoping tubes.

5. The cargo retainer of claim 2 wherein said outer tube is formed from a polymeric material.

6. The cargo retainer of claim 5 wherein said first and second telescoping tubes are formed from a polymeric material.

7. The cargo retainer of claim 6 wherein said first and second reinforcing tubes are formed from a metal.

8. The cargo retainer of claim 2 wherein said first and second latches each further comprise:

a housing;

a spring loaded catch pivotally contained within said housing and biased into a latched position for connecting said latch to a support structure; and, a pivot arm extending from said housing for pivotally attaching said first latch to said first telescoping tube and said second latch to said second telescoping tube.

9. The cargo retainer of claim 8 wherein said pivot arm includes an aperture receiving a pin inserted in said aperture and connected to one of said telescoping tubes.

10. A cargo retainer comprising:

an outer tube formed from a polymeric material and having first and second ends;

first and second telescoping tubes each formed from a polymeric material and slidably received in said first and second ends, respectively, of said outer tube, said first telescoping tube having an outer end portion proximate said first end of said outer tube and said second telescoping tube having an outer end portion proximate said second end of said outer tube;

a first reinforcing tube secured within the outer end portion of said first telescoping tube and coaxial with said first telescoping tube;

a second reinforcing tube secured within the outer end portion of said second telescoping tube and coaxial with said second telescoping tube;

a first latch secured to said first reinforcing tube and said first telescoping tube at the outer end portion of said first telescoping tube; and, a second latch secured to said second reinforcing tube and said second telescoping tube at the outer end portion of said second telescoping tube.

11. The cargo retainer of claim 10 wherein said first and second reinforcing tubes are formed from a metal.

12. The cargo retainer of claim 10 wherein said first latch is pivotally attached to the outer end portion of said first telescoping tube and said second latch is pivotally attached to the outer end portion of said second telescoping tube.

13. The cargo retainer of claim 11 wherein said first and second latches are pivotally attached to said first and second reinforcing tubes, respectively.

14. The cargo retainer of claim 11 further comprising spring biasing means for biasing said first and second telescoping tubes toward one another.

15. The cargo retainer of claim 14 wherein said spring biasing means is a tension spring connected between inner ends of said first and second telescoping tubes.

16. A cargo retainer comprising:

an outer tube having first and second ends;

first and second telescoping tubes slidably received in said first and second ends, respectively, of said outer tube, said first telescoping tube having an outer end portion proximate said first end of said outer tube and said second telescoping tube having an outer end portion proximate said second end of said outer tube;

a first pivotal latch attached to said outer end portion of said first telescoping tube for attaching said first telescoping tube to a support structure;

a second pivotal latch attached to said outer end portion of said second telescoping tube for attaching said second telescoping tube to a support structure; and, means for receiving said first and second latches in said outer tube such that an outer edge of each latch is at least substantially flush with the respective first and second ends of said outer tube when said first and second telescoping tubes are fully retracted.

17. The cargo restrainer of claim 16 wherein said means for receiving said first and second latches within said first and second end portions comprises a pair of diametrically opposed slots contained in each of said first and second ends of said outer tube.

18. The cargo restrainer of claim 16 wherein said first and second telescoping tubes each include a pair of diametrically opposed slots in the outer end portions thereof for receiving the respective latches therein.

19. The cargo retainer of claim 16 further comprising spring biasing means for retracting said first and second telescoping tubes into said outer tube.

20. The cargo retainer of claim 19 wherein said spring biasing means is a tension spring connected between inner ends of said first and second telescoping tubes.

\* \* \* \* \*